United States Patent
Galbi et al.

(10) Patent No.: US 7,447,948 B2
(45) Date of Patent: Nov. 4, 2008

(54) ECC CODING FOR HIGH SPEED IMPLEMENTATION

(75) Inventors: Duane E. Galbi, Cambridge, MA (US); Ranjit Loboprabhu, Shrewsbury, MA (US); Jose Niell, Franklin, MA (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 11/284,268

(22) Filed: Nov. 21, 2005

(65) Prior Publication Data
US 2007/0168768 A1 Jul. 19, 2007

(51) Int. Cl.
G06F 11/00 (2006.01)
(52) U.S. Cl. .................. 714/701; 714/764; 714/2; 714/6; 714/42; 714/48; 714/718; 714/719; 714/746; 714/758; 714/799; 714/800; 714/802; 714/804; 714/807; 714/818
(58) Field of Classification Search ................ None
See application file for complete search history.

(56) References Cited

U.S. PATENT DOCUMENTS

| | | | | |
|---|---|---|---|---|
| 3,751,646 A * | 8/1973 | Geng et al. | ................ | 714/758 |
| 3,972,033 A * | 7/1976 | Cislaghi et al. | ............. | 365/202 |
| 4,227,247 A * | 10/1980 | Kintner | ................ | 700/18 |
| 4,355,393 A * | 10/1982 | Kubo et al. | ................ | 714/805 |
| 4,400,778 A * | 8/1983 | Vivian et al. | ................ | 710/1 |
| 4,538,265 A * | 8/1985 | Day et al. | ................ | 714/17 |
| 4,670,876 A * | 6/1987 | Kirk | ................ | 714/703 |
| 5,241,547 A * | 8/1993 | Kim | ................ | 714/53 |
| 5,652,890 A * | 7/1997 | Foster et al. | ................ | 713/323 |
| 5,754,566 A * | 5/1998 | Christopherson et al. | ... | 714/773 |
| 6,101,614 A * | 8/2000 | Gonzales et al. | ............. | 714/6 |
| 6,233,717 B1 * | 5/2001 | Choi | ................ | 714/805 |
| 6,901,552 B1 * | 5/2005 | Fey et al. | ................ | 714/800 |
| 7,051,264 B2 * | 5/2006 | Leung et al. | ................ | 714/763 |
| 7,134,069 B1 * | 11/2006 | Longwell et al. | ............. | 714/800 |
| 2001/0029592 A1 * | 10/2001 | Walker et al. | ................ | 714/42 |
| 2003/0191888 A1 * | 10/2003 | Klein | ................ | 711/105 |

(Continued)

FOREIGN PATENT DOCUMENTS

EP 0312183 4/1989

(Continued)

OTHER PUBLICATIONS

IBM Technical Disclosure NN71122053, "Data Processing Initialization", Dec. 1, 1971, reference # 0018-8689-14-7-2053.*

(Continued)

*Primary Examiner*—John P Trimmings
(74) *Attorney, Agent, or Firm*—Blakely, Sokoloff, Taylor & Zafman LLP

(57) ABSTRACT

Methods and apparatus for performing error correction code (ECC) coding techniques for high-speed implementations. The ECC code word is structured to facilitate a very fast single-error-detect (SED) that allows state machines to be stopped within a single cycle when an error is detected and enables a corresponding single-error-correct (SEC) operation to be performed over multiple cycles while the state machines are in a suspended mode.

18 Claims, 13 Drawing Sheets

U.S. PATENT DOCUMENTS

2004/0098562 A1* 5/2004 Anderson et al. ............. 712/24
2007/0079185 A1* 4/2007 Totolos, Jr. ................. 714/718

FOREIGN PATENT DOCUMENTS

WO  2006/044252  9/2007

OTHER PUBLICATIONS

Weaver, C. et al., Techniques to Reduce the Soft Error Rate of a High-Performance Microprocessor, IEEE, Proceedings of the 31st Annual International Symposium on Computer Architecture (ISCA '04).

* cited by examiner

ECC CODING FOR HIGH SPEED IMPLEMENTATION

FIELD OF THE INVENTION

The field of invention relates generally to computer memories and, more specifically but not exclusively relates to an error correction code (ECC) coding technique for high-speed implementation.

BACKGROUND INFORMATION

The relentless progression to smaller feature sizes with each semiconductor process generation has had a negative impact on the soft-error rate (SER) of memory cells, such as SRAM (Static Random Access Memory) cells. Although process scaling has shrunk the charge collection diffusion area, it has also resulted in lower operating voltages, reduced internal node capacitances, and increased device impedances. These factors have reduced the critical charge necessary to upset the state of a SRAM cells faster than the corresponding reduction in the diffusion charge collection area. In addition, process scaling has increased the amount of SRAM that can be integrated into a system-on-a-chip (SOC), and hence increased the aggregate soft-error rate.

The soft error rate is typically measured in terms of FIT's. One FIT is one failure in 1 billion (1^9) hours of operation. To achieve a mean time between failures (MBTF) of one year, this requires a FIT rate of approximately 110,000. For computing servers or critical network equipment, a typical system goal is 1 failure in 1000 years, or a goal of under 100 FIT. For these high-availability systems and for data centers with large number of computers, SRAM SER has become a major concern.

There have been multiple solutions proposed to alleviate the SRAM soft-error rate problem. Multiple vendors (e.g., ST-Microelectronics) have proposed semiconductor process changes to increase the capacitance of SRAM cell internal nodes and hence increase the critical change necessary to cause a SER. Reducing SER through chip architecture changes has been proposed as well. Christopher Weaver et al. ("Techniques to Reduce the Soft Error Rate of a High-Performance Microprocessor," isca, p. 264, *Proceedings of the 31st Annual International Symposium on Computer Architecture*, Munich, Germany, 2004) propose reducing the number susceptible states to reduce the likelihood of a soft error. Other approaches that combine architectural and circuit changes have been proposed. One such example proposes designing the SRAM cell to reduce the SER susceptibility of a certain transition at the cost of increasing the susceptibility of the inverse transition. For example, one could reduce the "1" to "0" SER failure rate at the cost of increasing "0" to "1" SER failure rate. This would be combined with an asymmetric ECC code which requires fewer bits than a full symmetric ECC code.

The most common solution to the SRAM soft-error rate problem is to layer a SEC-DED (Single Error Correction-Double Error Detection) ECC over the SRAM subsystem. It is common to see a 72-bit ECC code word that contains 64-bits of data and 8 check bits. Other common implementations use a per-byte ECC system that uses 5-bits per byte or a total of 20-bits for a 4-byte word (common in ARM cores), or a 4-byte word coupled directly with 7 ECC check bits.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a diagram illustrating a known error correction coding (ECC) coding scheme for a 44-bit instruction word;

FIG. 4a is a schematic diagram illustrating an XOR tree implementing logic to perform a parity check for subset C of FIG. 2a;

DETAILED DESCRIPTION

Figure 3:
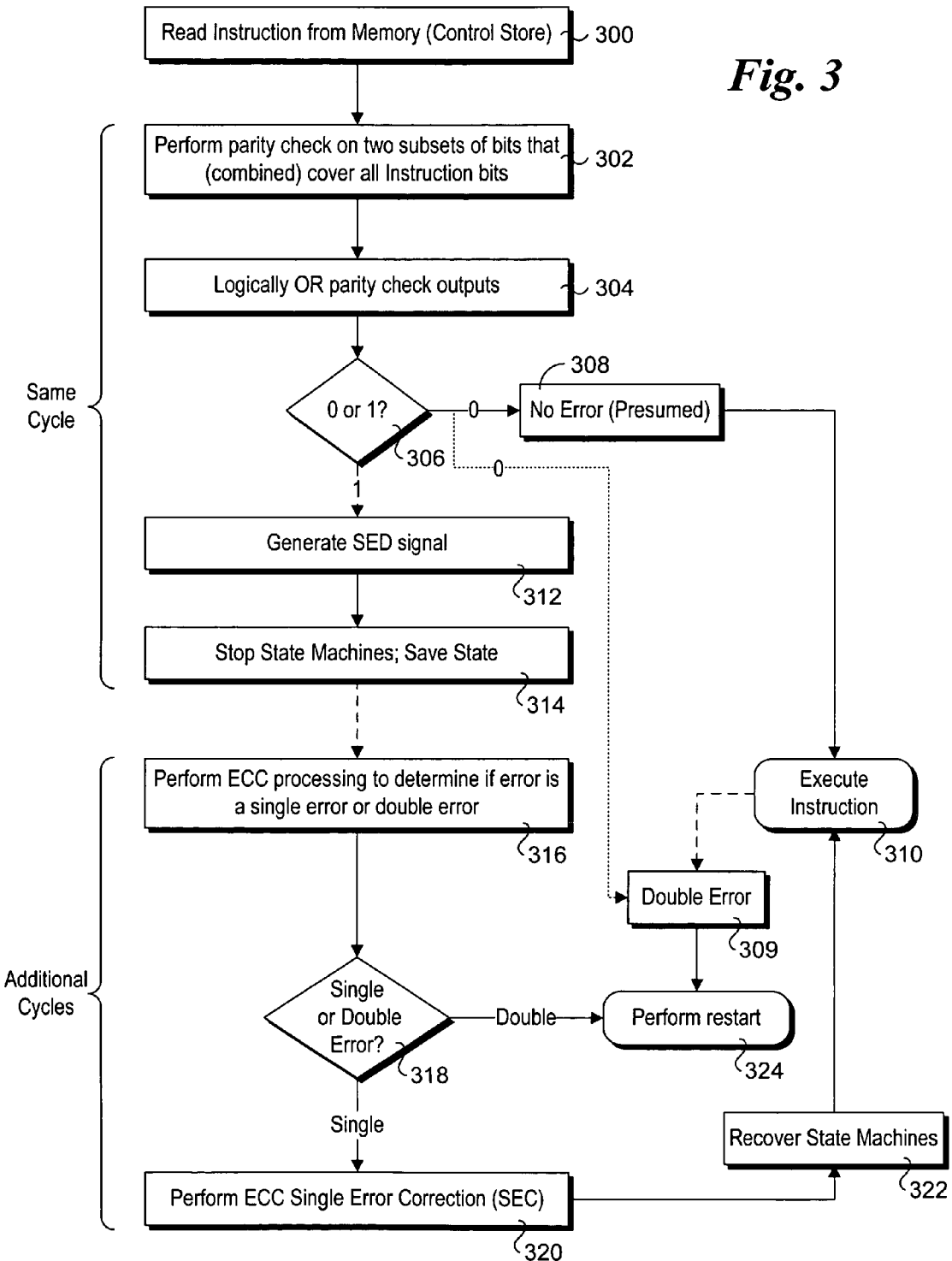
FIG. 3 is a flowchart illustrating operations and logic performed to detect and correct errors using the ECC coding scheme of FIG. 2.
Figure 4A:
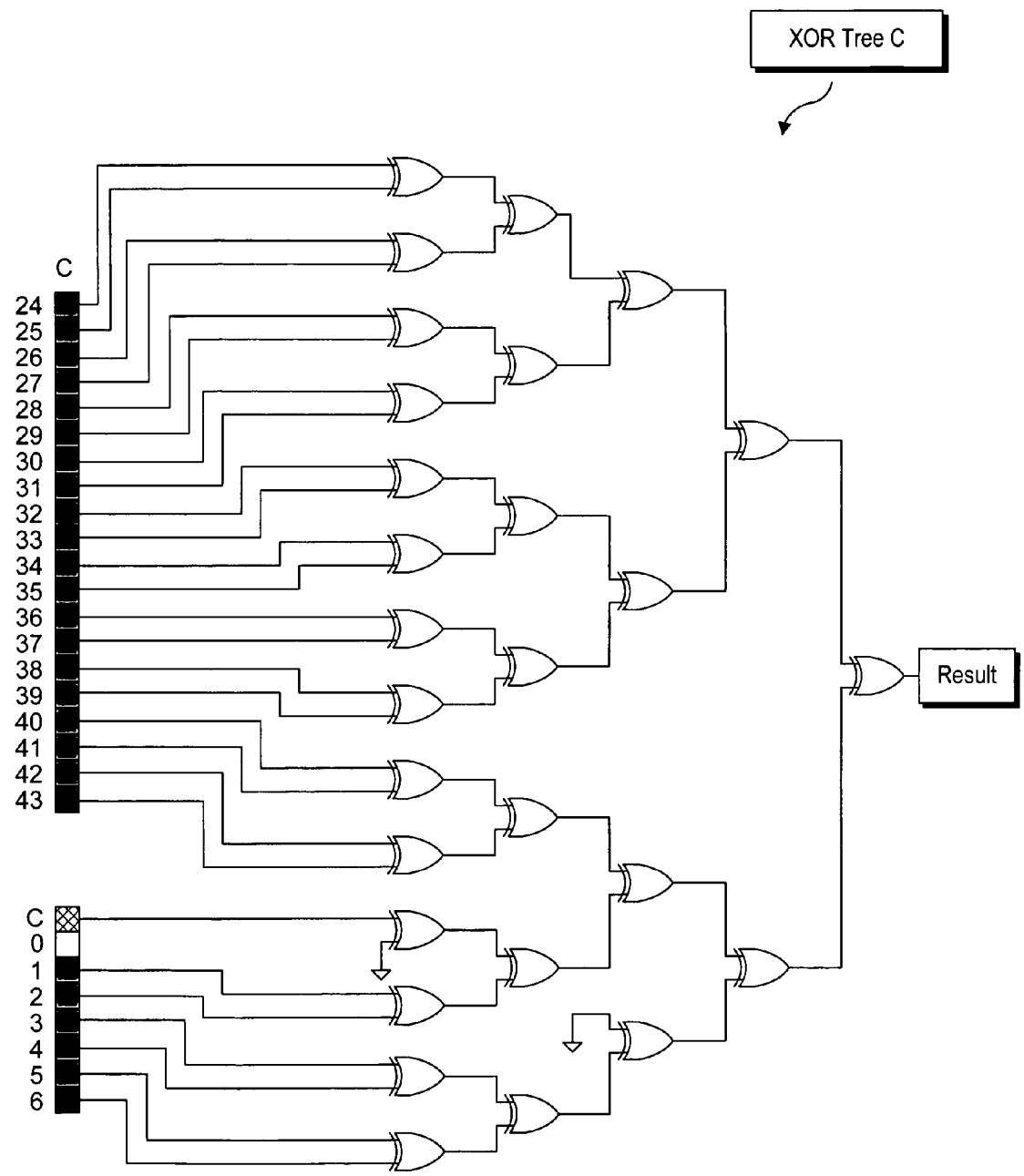
Figure 4B:
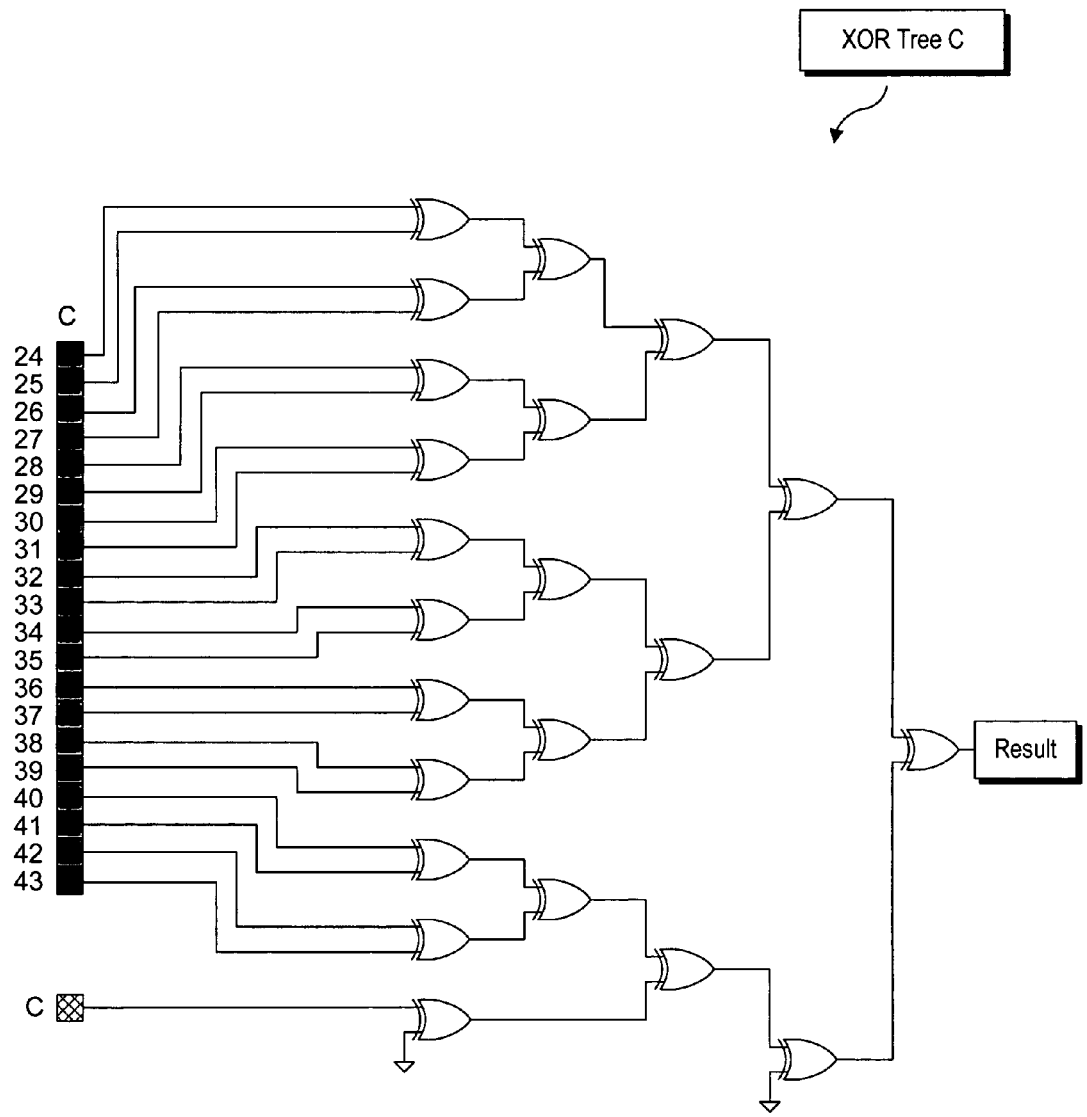
FIG. 4b is a schematic diagram illustrating an XOR tree implementing logic to perform a parity check for subset C of FIG. 2b.

Embodiments of methods and apparatus for performing error correction code (ECC) coding techniques for high-speed implementations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now presented, novel SEC-DED ECC coding schemes are disclosed that enable soft error correction to be added with a minimum perturbation to the overall SoC design. The ECC code word is structured to facilitate a very fast single-error-detect (SED) that enables SED in a fraction of a cycle. This quick error detection allows the clock to be stopped to applicable state machines when an error is detected and enables the slower single-error-correct (SEC) to happen over multiple cycles while the state machines are in a suspended mode. Meanwhile, since double errors can be detected but not corrected, the double-error-detect (DED) operation is not timing critical, and this fatal error can be signaled without the need to retain the original state.

An exemplary implementation of one embodiment of the invention is described herein as applied to instruction words for an Intel IXP 2800 network processor unit (NPU). However, it is noted that the principles and teachings of this embodiment may be employed on other processor architectures and for other types of memory error detection and correction implementations.

The Intel IXP 2800 NPU employs multiple compute engines referred to as "microengines." As described below with reference to FIG. 9, each microengine has its own set of local resources, including a local control store in which instructions (code) are stored. When an instruction is read from a control store, an ECC check is performed to ensure none of the instruction bits is in error.

Figure 1:
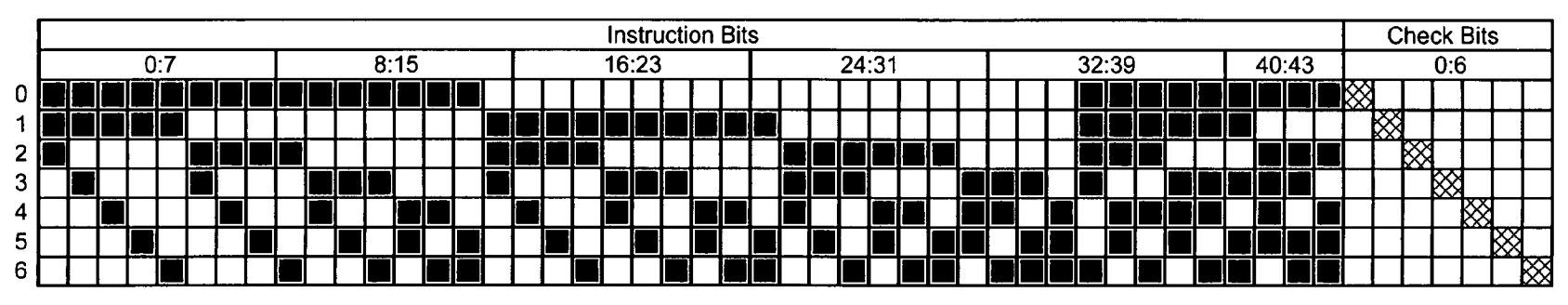

For embedded memory subsystems that store memory in bit-widths that are not a fixed multiple of bytes, Hamming's Theory has shown that "n+1"check bits can be used to form a SEC-DED ECC over at most "$2^n-1$" bits. For example, for a 44-bit instruction word, such as employed on an IXP 2800 microengine, seven check bits need to be added to the 44-bit instruction word to support an SEC-DED ECC. FIG. 1 shows the encoding of these check bits under one conventional implementation that employs seven check bits with even parity for a 44-bit instruction word.

As illustrated in FIG. 1, the first forty bits from the instruction word are grouped into bytes, with the last four bits having a separate group. There are seven subsets of bits, labeled 0-6, with a corresponding check bit for each subset. Each subset includes 22-25 bits. The bits corresponding to a given subset are highlighted in FIG. 1 to indicate those bits are used to determine the value of the even parity check bit for the subset. The combination of the bits in the subsets are chosen such that a single error in the instruction word can be identified and corrected using well-known ECC coding techniques. As is also known, the encoding scheme can identify conditions under which two or more errors are present in the instruction word, which is referred to as a double error. However, such double errors cannot be corrected using the scheme.

In further detail, when an instruction is read out of the microengine control store, the checks bits are recalculated (including the check-bit itself in the parity calculation) by performing a parity check on the summation of bits in each subset. If the results of the recalculations all return "0" (indicating the parity of the original and recalculated check bits match), then there is no error; otherwise a single or double error has occurred. Hence that calculation of the SED signal requires XORing seven 22 to 25-bit quantities, where each bit of the 44-bit instruction word fans out to three to five of these calculations, and performing a final seven-bit OR operation to produce the SED signal.

With approximately three levels of logic for the final seven bit OR operation and four gate delays of buffering (two due to the logical fanout and two due from the physical layout of the XOR tree, which required bits from all locations in the instruction word to be included XOR trees), there is approximately seven levels of logic on top of the five levels of logic needed by the 26-bit XOR operation. This amount of logic makes it unfeasible to stop the microengine state machines in the same cycle that the SED signal is generated; and hence, enough state information needs to be maintained to roll-back the microengine to the cycle before the error was detected in order to perform a correction. This is very time-consuming, and increases processing latencies when errors are detected. Furthermore, it requires additional resources for storing the state information.

Figure 2A:
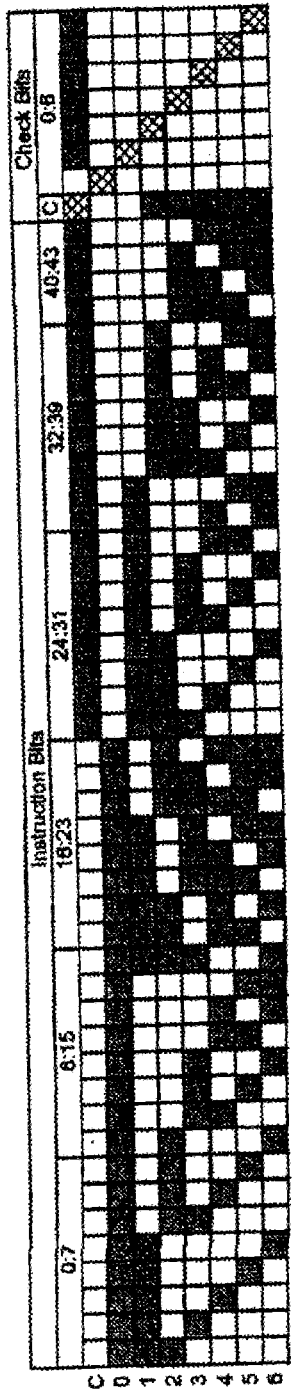
FIG. 2a is a diagram illustrating an ECC coding scheme that supports quick single error detect (SED) including detection of errors in the check bits, according to one embodiment of the invention.

A significantly faster encoding scheme in accordance with one embodiment of the invention is shown in FIG. 2a. Under this approach, the encoding is portioned into two operations: 1) a very quick encoding to generate an SED signal indicative of a single error; and 2) ECC encoding to either correct a single error or detect a double error. Since the SED is generated very quickly, the microengine state machines can be stopped during the same cycle the error is detected, while subsequent logic is implemented for either correcting a single error or detecting a double error while the state machines are suspended.

As illustrated in FIG. 2a, the encoding of the bits for each subset 0-6 are rearranged relative to the subsets in FIG. 1. In addition, an extra subset and corresponding check bit labeled "C" is employed, as illustrated by subset C. An examination of subsets C and 0 reveal that all bits in the instruction word are covered by these two subsets. As a result, a single bit error can be easily identified by simply XOR'ing the bits in each of subsets 1 and 2 to generate the corresponding check bits (0 and 1), and then OR'ing these two check bits. If a single error is present, one of the two check bits will change, which can be detected using the OR'ing operation. Furthermore, since each instruction word bit only contributes to one of these two check bits, all the buffering requirements previously imposed by recalculation of all of the full set of the ECC check bits are eliminated.

In addition to calculating the parity check over the instruction word bits, the parity check is calculated over checkbits C and 1-6 for subset C in the encoding scheme of FIG. 2a. Meanwhile, in the encoding scheme of FIG. 2b, only checkbit C is including in the parity calculation (in addition to the instruction word bits for subset C).

As shown in FIG. 2a, the bits contributing to the check bits can ordered to correspond cleanly to the physical ordering of the SRAM output of the control store. Because an error in the check bits does not cause problems in the instruction word, the check bits do not really need to be included in the generation of the addition check bit "C" that is added in the embodiment of FIG. 2a. However, including these check bits in this check bit generation allows the standard reading of the code store to be used to "scrub" soft errors from the control store data, as described below with reference to FIG. 11. This means that if a soft error is detected in the control store, the correct data is written back into the control store. This reduces the likelihood that multiple single errors will accumulate to generate a double error.

Figure 2B:
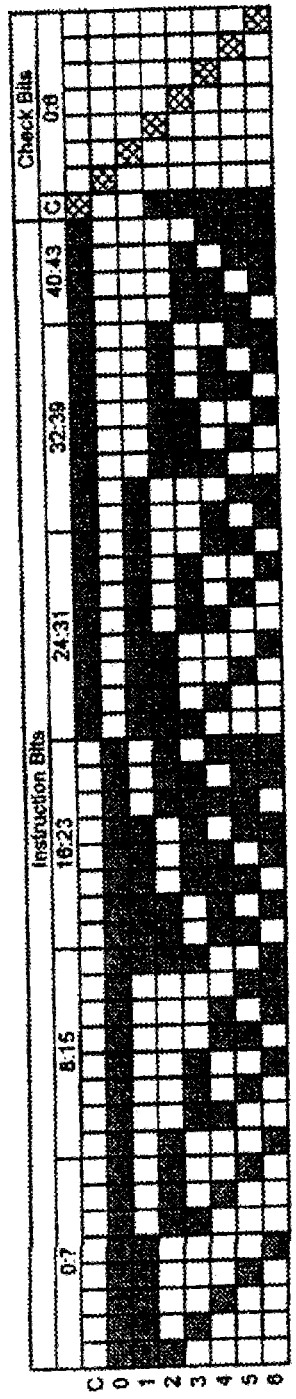
FIG. 2b is a diagram illustrating an ECC coding scheme that supports quick single error detect (SED) without detecting errors in a check bit, according to one embodiment of the invention.
Figure 9:
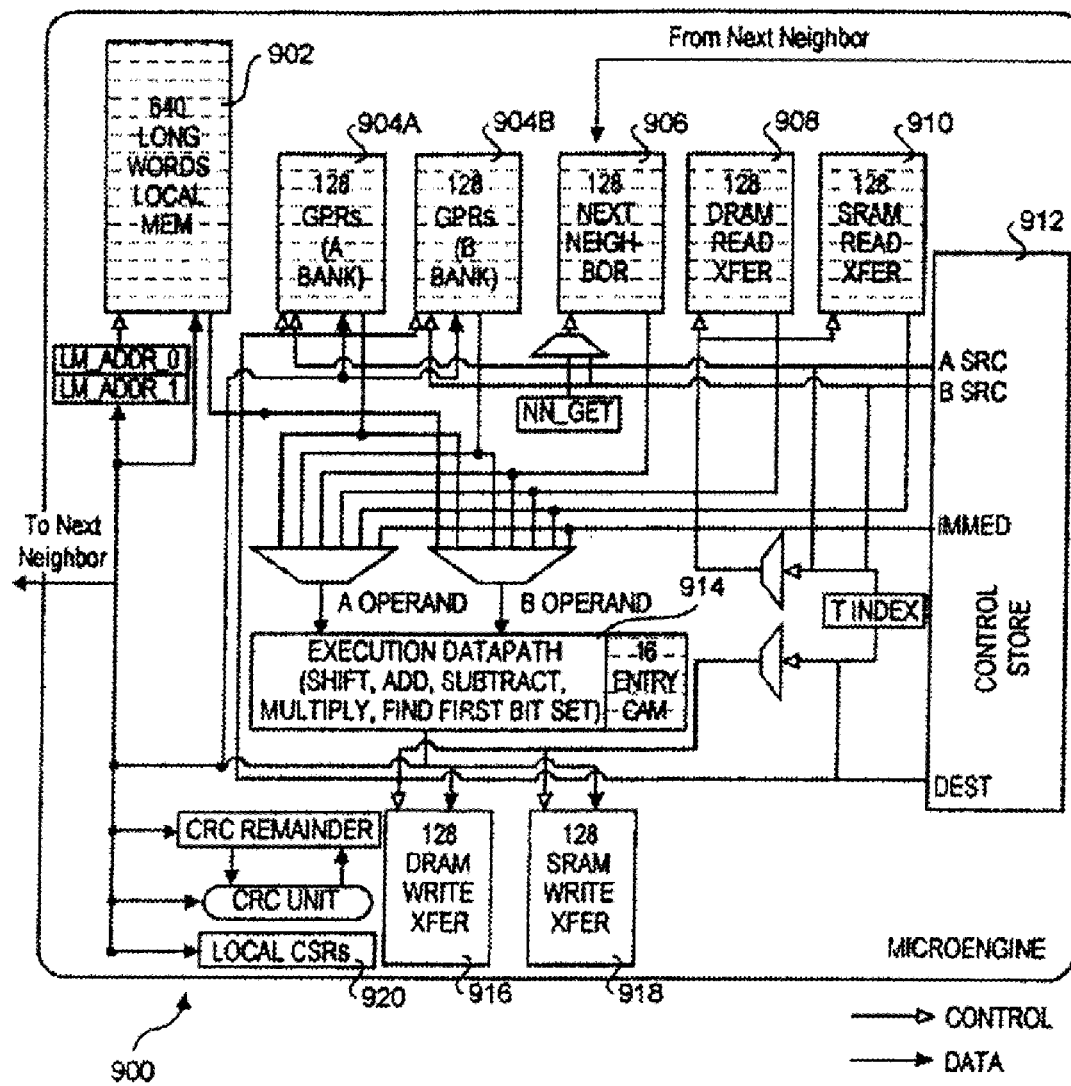

Using the ECC encoding schemes illustrated in FIGS. 2a and 2b, the SED signal can be calculated with only one additional logic level above that of the standard 26-bit XOR tree discussed above. This is a saving of approximately six levels of logic over the more standard ECC encoding scheme. This quick generation of the SED signal allows the state machines to be stopped in the same cycle the error is detected, and hence very little state is needed to be retained to restart these state machines upon recovery from an error condition.

With reference to the flowchart of FIG. 3, high-speed ECC run-time operations in accordance with one embodiment proceed in the following manner. The process begins in a block 300, wherein data is read from a memory device. For example, in the instant 44-bit instruction word example, and instruction word is read from a microengine control store.

In a block 302, a parity check is performed on two subsets of bits that, when combined, cover all the bits in the instruction word. For example, the combination of subsets 0 and 1 for the encoding of FIGS. 2a and 2b meet this condition. As discussed above, the parity check is performed over the subset bits and the check bit associated with the subset. The results of the parity checks for each of the two subsets are then logically OR'ed in a block 304. As depicted by a decision block 306, the result of block 304 will either be a logical '0' or a '1'.

In accordance with the foregoing parity check scheme, a change in one of the bits (including the check bit itself), while result in a parity output of '1' (for an even parity implementation). Thus, if a single bit error exists, the output for one of the two parity check will be '1', while the other will be '0'; when logically OR'ed, the result is a '1'. Now suppose that a double error is present having exactly two erroneous bits. In a first example, both bit errors occur in the same subset. As a result, the parity check for that subset will produce a '0', while the parity check for another subset will also produce a '0', and the logically OR'ed result will indicate no error is present. However, if the double error comprises a single error present in both subsets, each parity check will produce a '1', leading to an OR'ed result of 1, indicating the presence of an error.

As indicated by blocks 308 and 309, and in view of the foregoing discussion, the result of a '0' output from decision block 306 will either represent a no error condition, or and actual double error condition. The double error condition is not actually checked for at this point, since it is uncorrectable even if it was identified. Such a condition will generally lead to an errant condition that may or may not be recoverable, depending on the particular circumstances. Accordingly, the no error condition is presumed (as indicated by block 308), and the instruction forwarded along the execution path to be executed in a normal manner, as depicted by a continuation block 310. If a double error condition does actually exist, it will be subsequently detected (block 309), and the microengine will be restarted in accordance with a continuation block 324 to initiate a recovery process.

If the output of decision block 306 is a '1', a single error condition is detected. Accordingly, a single error detection (SED) signal is generated in a block 312. In response to receiving an SED signal, the microengine state machines are stopped, and the states are saved in a block 314.

At this point, ECC operations are performed to attempt to recover from the error condition. First, in a block 316, a parity check is made for each subset, and the results are checked to determine if the error is a single error or double error. As depicted by a decision block 318, if the operation of block 316 reveals the presence of a double error, the logic proceeds to block 324, as before. However, if the operation of block 316 determines that a single error exists, an ECC single error correction (SEC) operation is performed in a block 320. Such ECC SEC operations are well-known, and enable data errors to be recovered using a predefined error correction scheme. As a result, the instruction word is corrected, and now may be employed in the normal matter. However, prior to employing the instruction word in a normal manner in continuation block 310, the state machines are first recovered in a block 322.

As depicted at the left hand of the FIG. 3 flowchart, the first set of operations that are implemented to determine if an error is present and stopping the state machines under such a condition are performed in the same cycle. Thus, the state machines may be stopped, if applicable, during this same cycle, minimizing the amount of state machine "roll-back" that will be necessary to perform the recovery operation of block 322. Meanwhile, the subsequent operations depicted in FIG. 3 may consume one or more additional cycles. Notably, since the state machines are stopped prior to performing these operations, the number of additional cycles that are consumed (and thus the overall timing of the process) is not critical.

FIGS. 4a, 4b, 5 and 6 show exemplary schemes for performing parity checks for various subsets of instruction word bits using XOR trees. For example, the XOR tree structure of FIG. 4a (XOR Tree C) is employed for subset C in FIG. 2a, which corresponds to the bits 24:43 in the instruction word, along with parity check bits C and 1:6. As illustrated, the parity result is obtained using five levels of XOR logic blocks. The XOR tree structure of FIG. 4b (corresponding to the encoding of subset C of FIG. 2b) is similar, except the later parity check bits 1:6 are not included in the parity check calculation.

Figure 5:
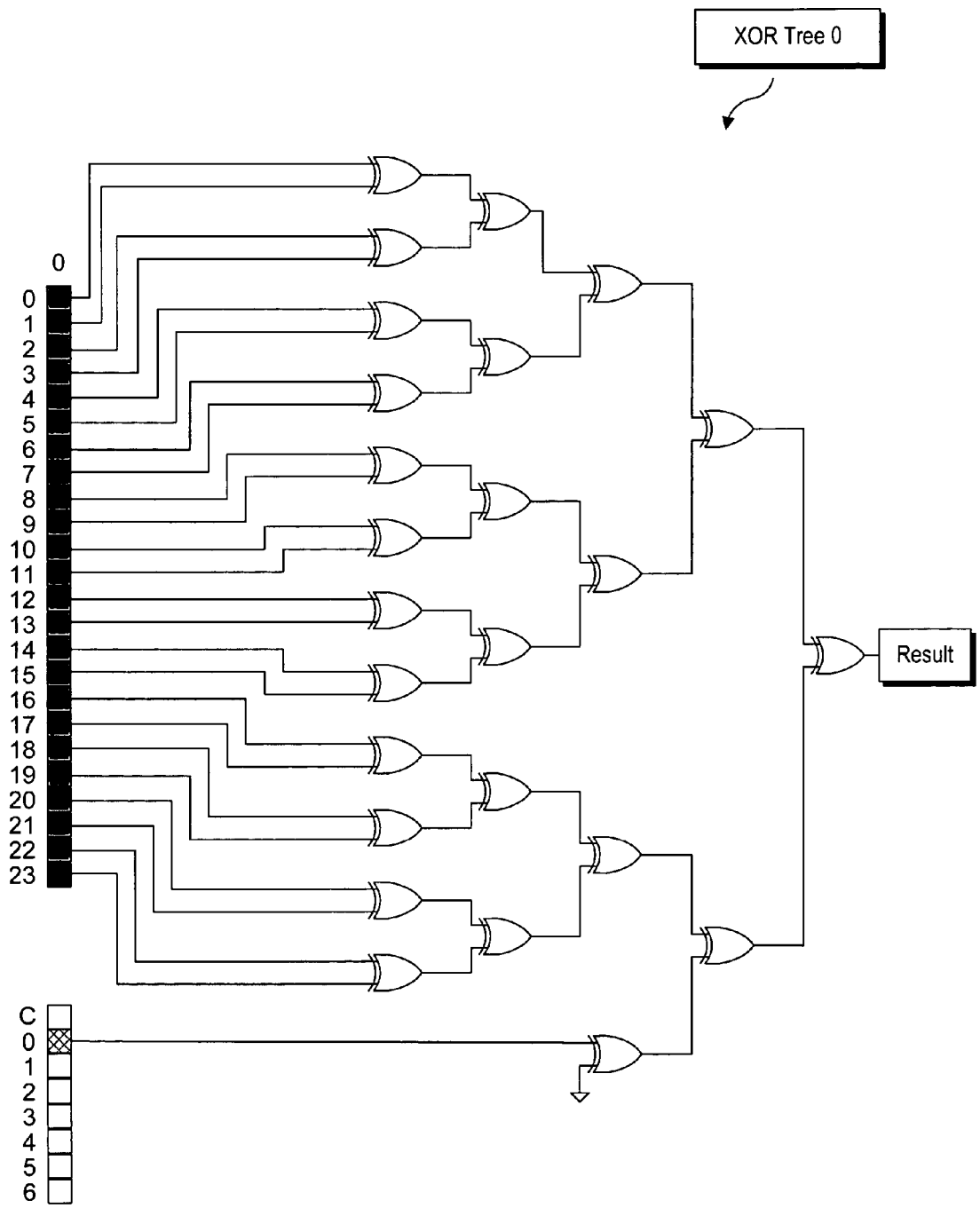
FIG. 5 is a schematic diagram illustrating an XOR tree implementing logic to perform a parity check for subset 0 of FIGS. 2a and 2b.

The XOR tree structure (XOR Tree 0) of FIG. 5 is employed for subset 0 in FIGS. 2a and 2b, which corresponds to the first 24 bits in the instruction word, along with parity check bit 0. As illustrated, this parity result is also obtained using five levels of XOR logic blocks. (It is noted that in each of the XOR trees illustrated herein, appropriate delay circuitry may be substituted for XOR blocks having one of the inputs depicted as being tied to common (i.e., a '0' input).)

Figure 6:
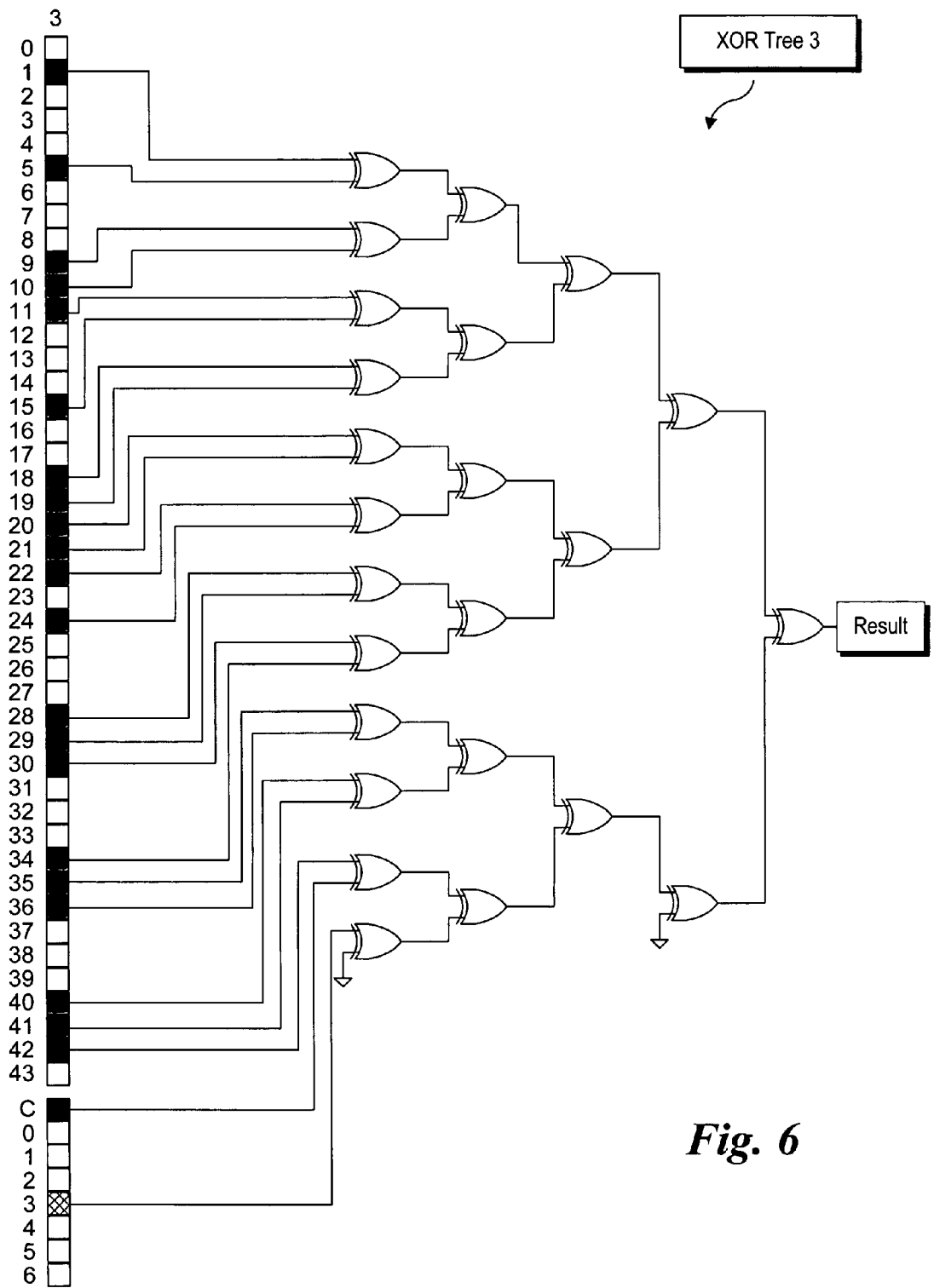
FIG. 6 is a schematic diagram illustrating an XOR tree implementing logic to perform a parity check over the bits for subset 3 of the ECC coding schemes of FIGS. 2a and 2b.

The XOR tree structure illustrated in FIG. 6 is used to calculate the parity for subset 3 in FIGS. 2a and 2b. In this case, the number of instruction words bits is only 21, plus the parity check bits C and 3. Accordingly, the number of XOR logic blocks to perform the calculation are less than that employed for FIGS. 4a and 5. However, there are still five levels of logic employed for the calculation.

Figure 7:
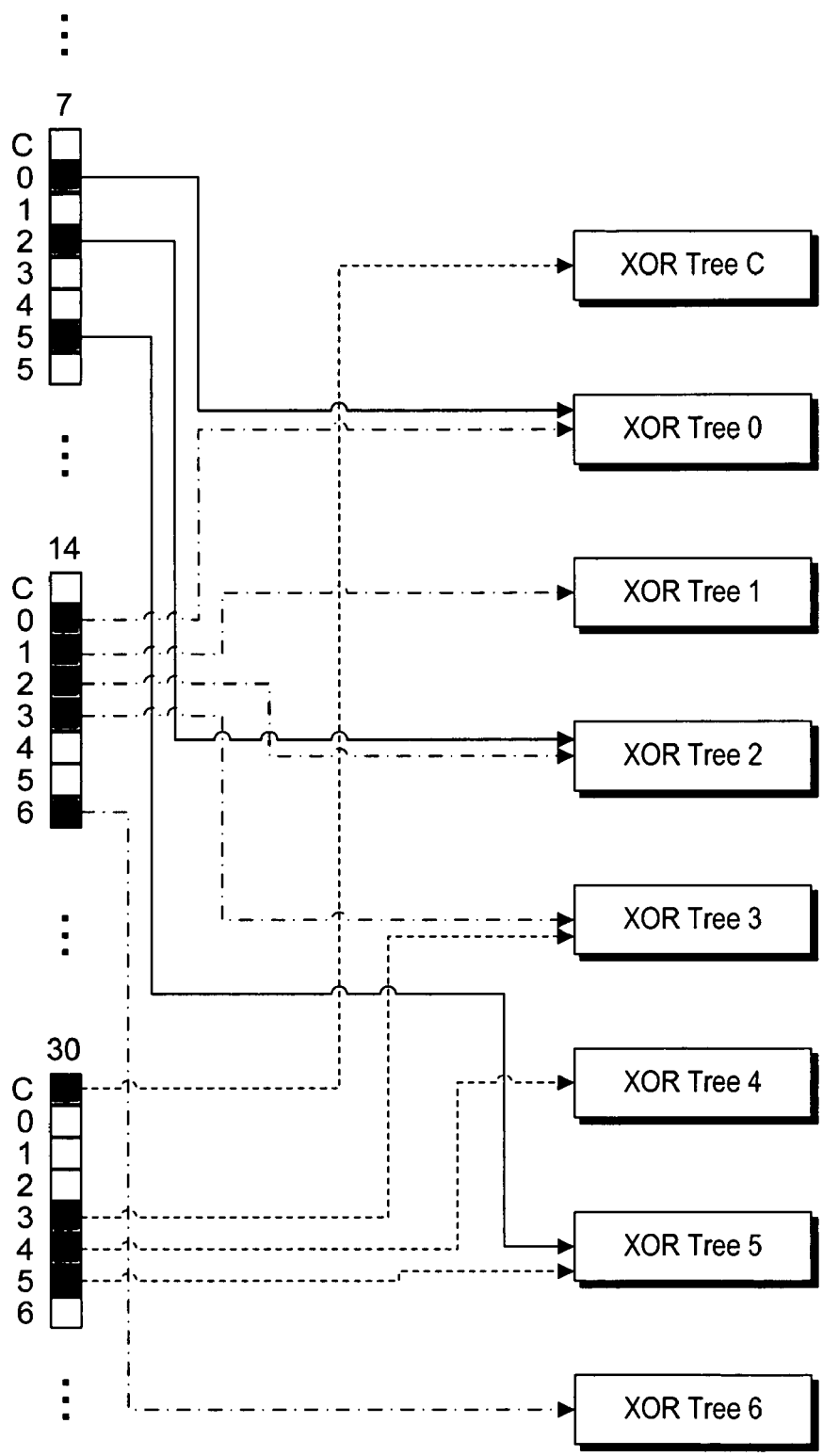
FIG. 7 is a schematic diagram illustrating exemplary fanouts of instruction word bits to multiple XOR trees to generate ECC check bits.

FIG. 7 schematically illustrates the aforementioned instruction word bit fanout. In this figure, the XOR tree 0-7 blocks each represent an XOR tree similar to the XOR trees shown in FIGS. 4a, 4b, 5 and 6, wherein the particular configuration of each XOR tree will depend on the corresponding parity calculation to be performed for each subset. (For example, the XOR tree C block corresponds to the XOR tree of FIG. 4a, while the XOR tree 0 blocks corresponds to the XOR tree of FIG. 5, etc.). Three exemplary cases are illustrated in FIG. 7: a 3 XOR tree fanout for bit 7 of the instruction word; a 5 XOR tree fanout for bit 15; and a 4 XOR tree fanout for bit 40. In a similar manner, a fanout to 3-5 XOR trees would be implemented for each bit in the instruction word.

Figure 8:
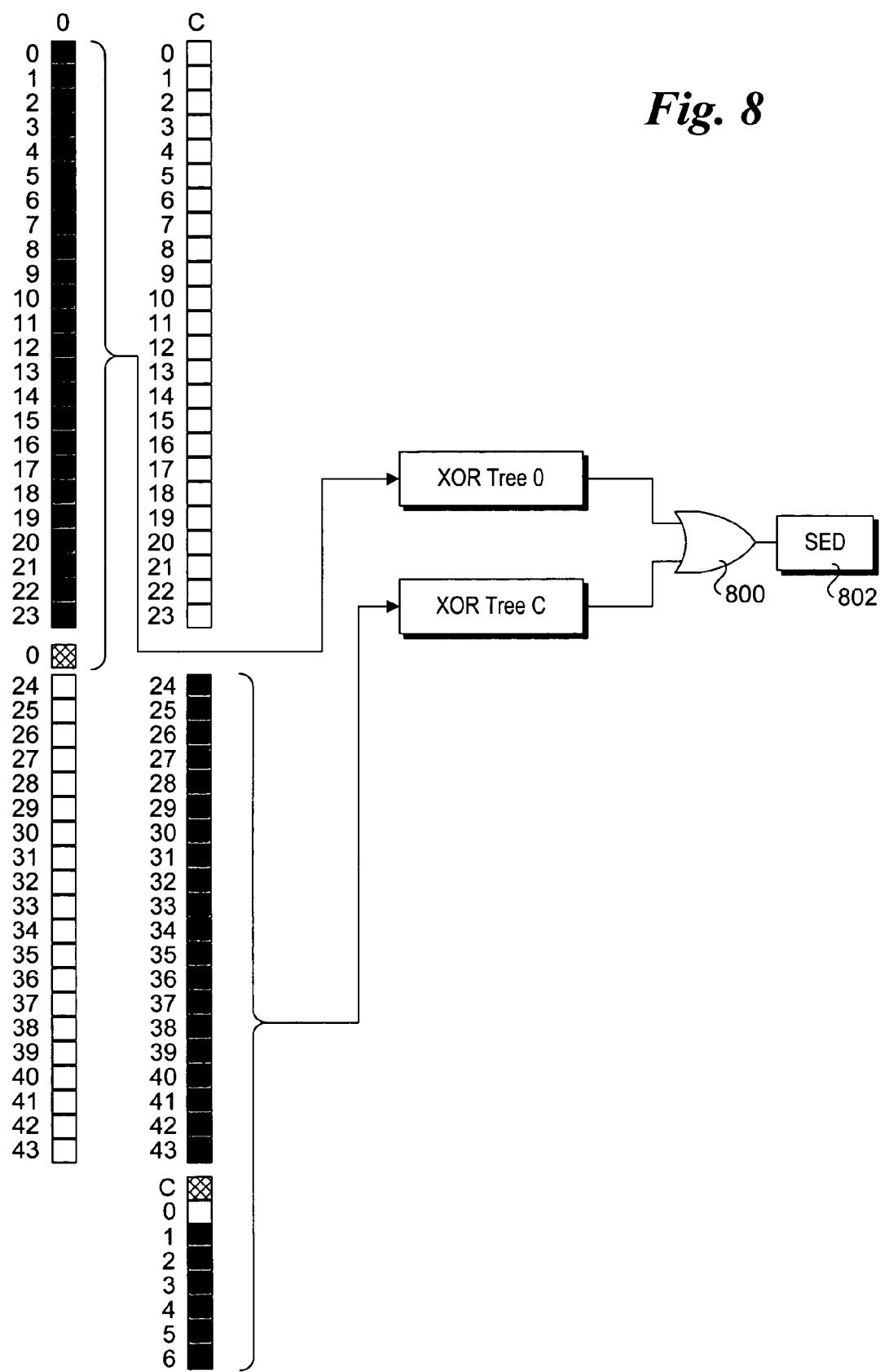
FIG. 8 is a schematic diagram illustrating an SED scheme that employs two subsets of instruction words bits corresponding to the first two subsets of the ECC coding scheme of FIGS. 2a and 2b.

FIG. 8 shows a logic scheme to quickly perform an SED calculation in accordance with blocks 302 and 304 of FIG. 3. In a manner similar to that shown in FIG. 4a, a respective five-level XOR tree is used to perform the parity calculation for each of the instruction bits corresponding to subsets C and

0 in FIG. 2a. For convenience, these XOR trees are represented as an XOR Tree C block and an XOR Tree 0 block. The output of these XOR trees are then logically OR'ed, as depicted by an OR block 800. The SED value 802 corresponds to the logic-level of the output from OR block 800.

The scheme of FIG. 8 yields the following results. If a single bit error is present in either the instruction word or one of the check bits C or 0, one of the two XOR trees C and 0 will output a logical '1', while the other XOR tree will output a logical '0'. Accordingly, a logical 1 will be output by OR block 800, thus enunciating an SED signal in block 312 of FIG. 3. A similar situation would result if a double error was present that included a single bit error in each of subset C and subset 0. In this case, the output of both XOR trees C and 0 would be a logical '1', resulting in a logical '1' output by OR block 800. Now consider the case in which a double error is present in a single subset, while the other subset is error-free. Since two errors are present in the same subset, the parity calculation output will remain at logic level '0', indicating no error is present. As discussed above with reference to FIG. 3, the presence of such a double error will be determined through subsequent operations.

In general, the error detection scheme of the embodiments described herein may be used to detect errors in either instruction words or data. Under the operations and logic of the flowchart of FIG. 3, a scheme for detecting errors in instruction words is provided. Such a scheme may be implemented within the instruction load path of various types of processors.

Figure 9:
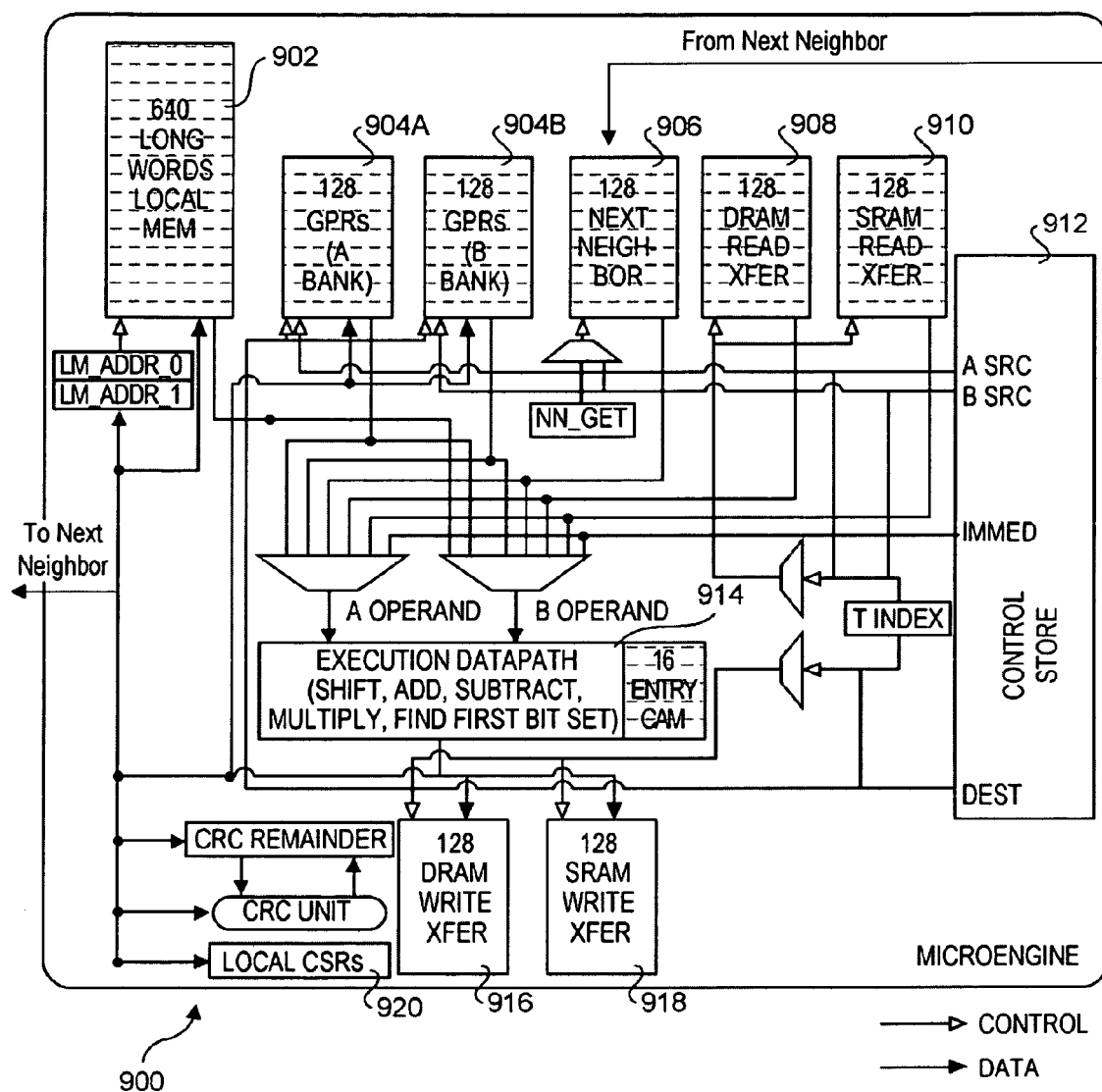
FIG. 9 is a schematic diagram of an Intel IXP 2xxx microengine.

An implementation on an exemplary processor is shown in FIG. 9, which depicts a microengine architecture 900 corresponding to a compute engine of an Intel IXP2xxx network processor unit (NPU). Architecture 900 depicts several components typical of compute-engine architectures, including local memory 902, general-purpose register banks 904A and 904B, a next neighbor register 906, a DRAM (Dynamic Random Accessible Memory) read transfer (xfer) register 908, an SRAM read transfer register 910, a control store 912, execution datapath 914, a DRAM write transfer register 916, and a SRAM write transfer register 918.

Architecture 900 support n hardware contexts. For example, in one embodiment n=8, while in other embodiments n=16 and n=4. Each hardware context has its own register set, program counter (PC), condition codes, and context specific local control and status registers (CSRS) 920. Unlike software-based contexts common to modern multi-threaded operating systems that employ a single set of registers that are shared among multiple threads using software-based context swapping, providing a copy of context parameters per context (thread) eliminates the need to move context specific information to or from shared memory and registers to perform a context swap. Fast context swapping allows a thread to do computation while other threads wait for input/output (IO) resources (typically external memory accesses) to complete or for a signal from another thread or hardware unit.

Figure 10:
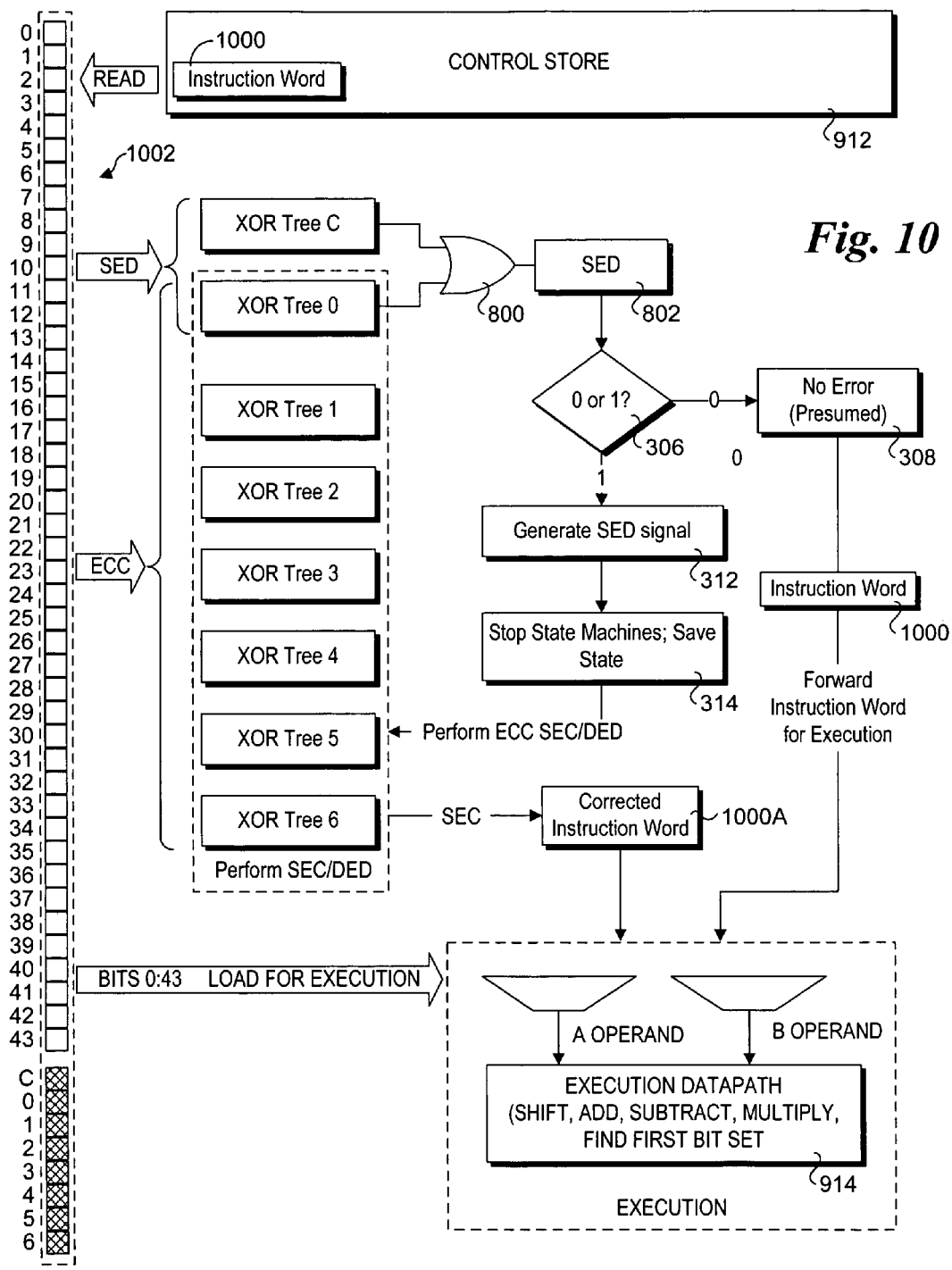
FIG. 10 is a schematic flow diagram illustrating components and logic implemented on an Intel IXP 2xxx microengine to perform high-speed error detection and correction in accordance with aspects of the embodiments disclosed herein.

FIG. 10 shows an implementation of various aspects of the logic employed by the embodiments described herein on a compute engine employing architecture 900. In the illustrated example, each of multiple instruction words 1000 stored in control store 912 are read and loaded into an ECC register 1002. In another embodiment, the ECC register 1002 is representative of an output port (buffer) for control store 912. In response to loading an instruction word into the register, a very quick SED calculation is made using the results of the parity checks performed by XOR trees C and 0, which have inputs coupled to appropriate bit positions in ECC register 1002. If the output of SED block 802 is '0', no error is presumed, and the instruction is forwarded to the instruction path for the compute engine for execution. However, if the output of SED block 802 is a '1', an SED signal is generated in block 312, the state machines are stopped and states saved in block 314, and SEC/DED ECC operations are performed using the outputs of XOR trees C and 0-6. If the instruction word includes a single error, it is corrected by the SEC operation, and the corrected instruction word 1000A is forwarded to the instruction execution path. If a double error is detected, a corresponding restart operation is initiated.

As mentioned above, the ECC scheme of FIG. 2a can also be employed for a memory "scrubbing" operation. Under this technique, instruction words are read from a control store, checked for single errors, and corrected if such errors are present using an on-going background operation so as to not interfere with the normal instruction usage. For example, in one embodiment a dedicated thread for a multi-threaded compute engine is used to perform the memory scrubbing operations as a background task.

Figure 11:
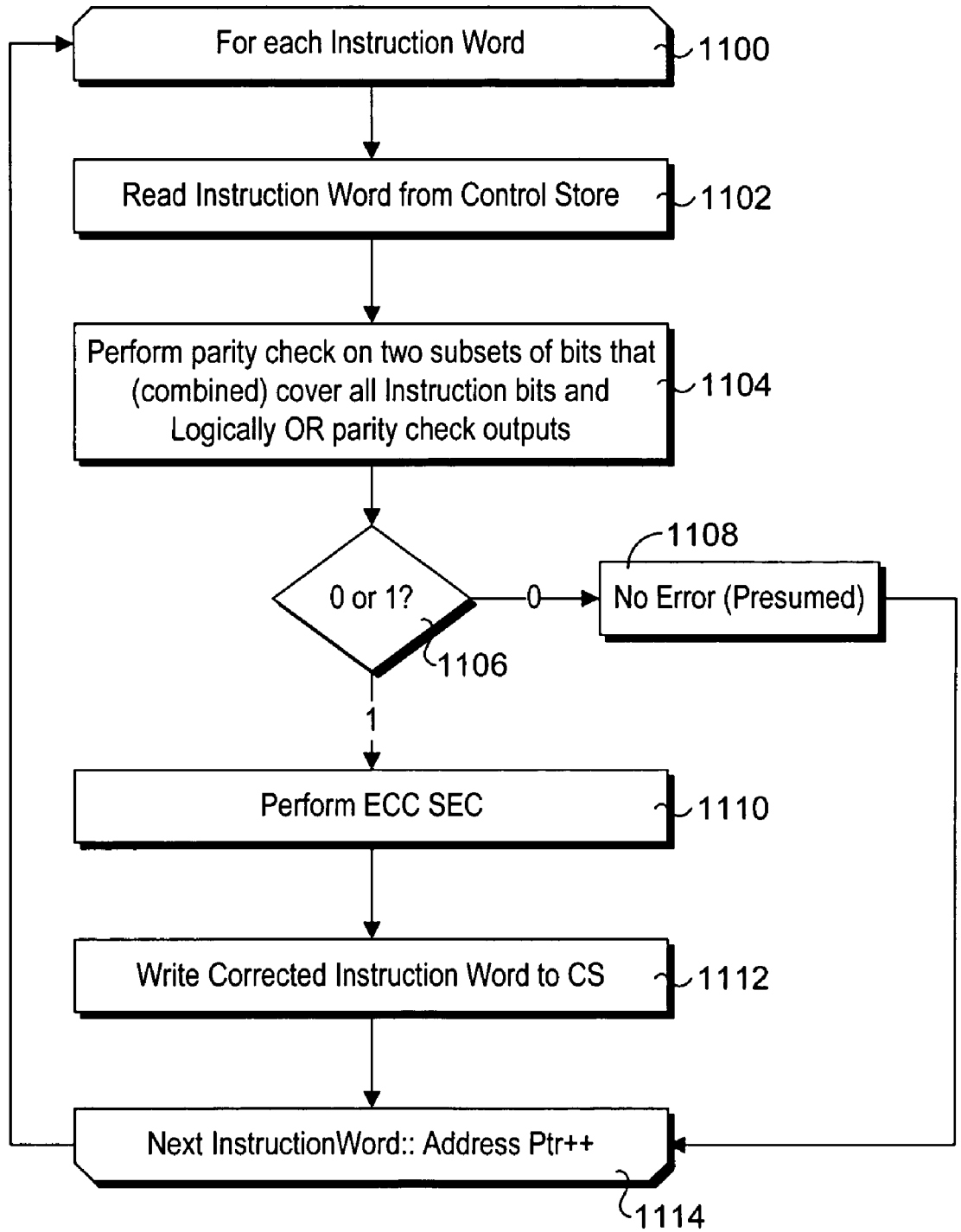
FIG. 11 is a flowchart illustrating operations and logic for performing a memory scrubbing operation, in accordance with one embodiment of the invention.

FIG. 11 shows a flowchart illustrating operations and logic performed during one embodiment to facilitate memory scrubbing. As depicted by start and end loop blocks 1100 and 1114, the operations and logic inside these end loop blocks are performed for each instruction word in the control store, with the instruction address being incremented by one instruction word for each iteration. It is noted that in one embodiment a preemption scheme is implemented such that the background thread is preempted from accessing instruction words that are currently being accessed by other compute engine threads.

In a block 1102, the currently-evaluated instruction word is read from the control store and loaded into a register to which the XOR tree logic is tied in the manner discussed above and illustrated in FIG. 10. A parity check on two subsets of bits that cover all of the instruction word bits is performed, with the result being logically OR'ed, as depicted in a block 1104. For example, the parity check is performed on subsets C and 0 for the ECC encoding scheme of FIG. 2a. As depicted by a decision block 1106, if the result of the operation of block 1104 produces a '0', no error is presumed (as depicted by block 1108), and the logic proceeds to end loop block 1114, wherein the instruction address pointer is incremented to point to the next instruction word to be evaluated.

In contrast, if the result of the operation of block 1104 is a '1', a single error is detected. In response, an ECC SEC operation is performed in a block 1110 to correct the single error in the instruction word, followed by writing the corrected instruction word back to its memory location in the control store, at 1112, which is identified by the current instruction word pointer (not to be confused with the instruction pointers used by other threads). The logic then proceeds to end loop block 1114 to increment the instruction address pointer and the logic loops back to start loop block 1110 to begin the next iteration of operations.

By performing the foregoing memory scrubbing technique, single errors can be detected and corrected for instructions that are stored in a control store or similar type of SRAM store prior to loading the instructions for execution. By frequently correcting such single errors (should they be encountered), the likelihood of the presence of a double error in an instruction word is significantly reduced.

Figure 12:
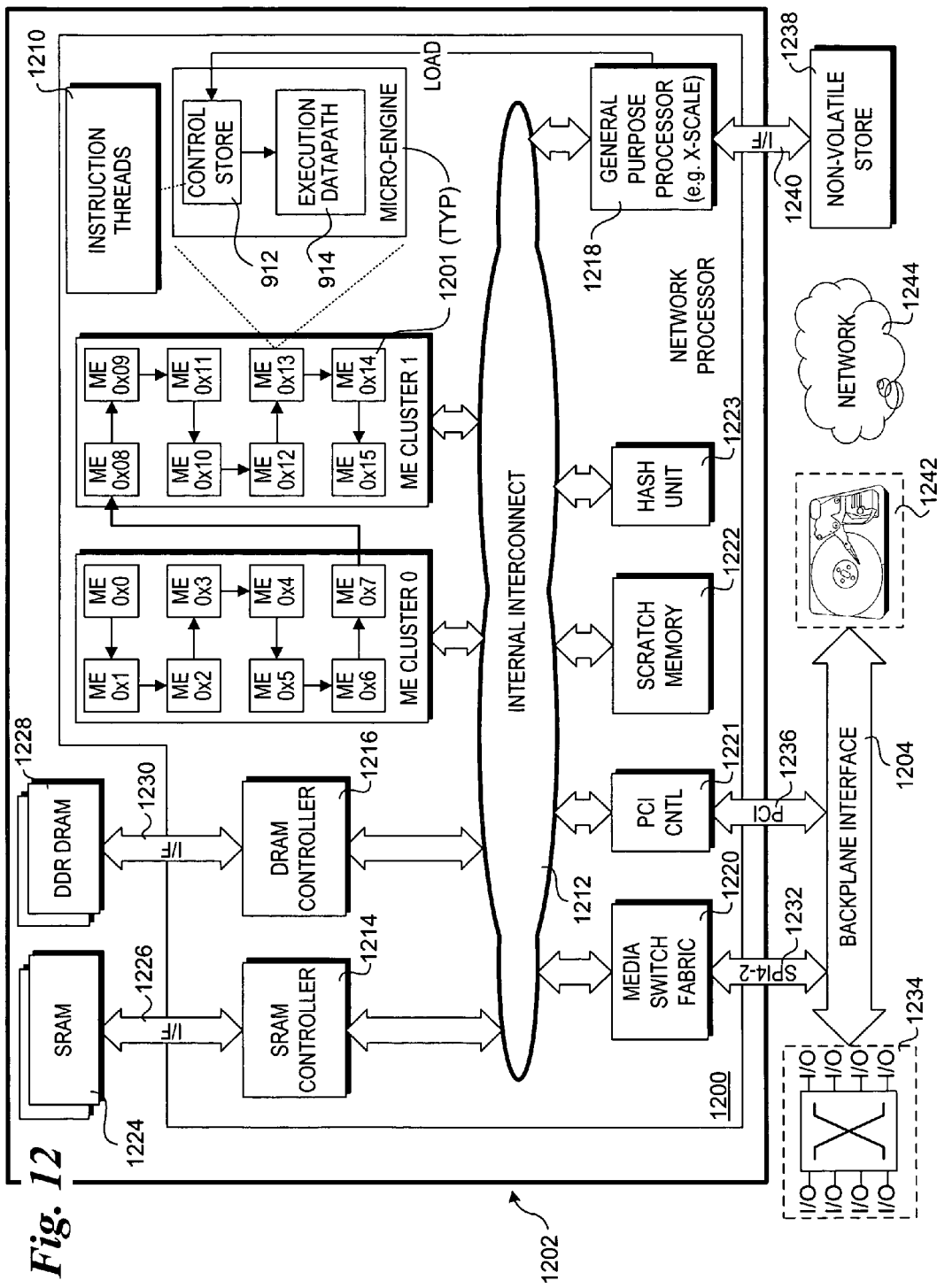
FIG. 12 is a schematic diagram of an exemplary network line card employing a network processor unit including compute engines that implement aspects of the ECC encoding schemes and logic of the embodiments disclosed herein.

FIG. 12 shows an exemplary implementation of a network processor 1200 that includes one or more compute engines (e.g., microengines) that implement the error detection and correction schemes discussed herein. In this implementation, network processor 1200 is employed in a line card 1202. In general, line card 1202 is illustrative of various types of network element line cards employing standardized or proprietary architectures. For example, a typical line card of this type may comprise an Advanced Telecommunications and Computer Architecture (ATCA) modular (printed circuit) board (PCB) that is coupled to a common backplane in an ATCA chassis that may further include other ATCA modular boards. Accordingly the line card includes a set of connectors mounted to a PCB that are configured to mate with mating connectors on the backplane, as represented by a backplane interface 1204. In general, backplane interface 1204 supports various input/output (I/O) communication channels, as well as provides power to line card 1202. For simplicity, only selected I/O interfaces are shown in FIG. 12, although it will be understood that other I/O and power input interfaces also exist.

Network processor 1200 includes n microengines 1201. In one embodiment, n=8, while in other embodiment n=16, 24, or 32. Other numbers of microengines 1201 may also me used. In the illustrated embodiment, 16 microengines 1201 are shown grouped into two clusters of 8 microengines, including an ME cluster 0 and an ME cluster 1. In the illustrated embodiment, each microengine 1201 executes instructions (microcode) that are stored in a local control store 912.

Each of microengines 1201 is connected to other network processor components via sets of bus and control lines referred to as the processor "chassis". For clarity, these bus sets and control lines are depicted as an internal interconnect 1212. Also connected to the internal interconnect are an SRAM controller 1214, a DRAM controller 1216, a general purpose processor 1218, a media and switch fabric interface 1220, a PCI (peripheral component interconnect) controller 1221, scratch memory 1222, and a hash unit 1223. Other components not shown that may be provided by network processor 1200 include, but are not limited to, encryption units, a CAP (Control Status Register Access Proxy) unit, and a performance monitor.

The SRAM controller 1214 is used to access an external SRAM store 1224 via an SRAM interface 1226. Similarly, DRAM controller 1216 is used to access an external DRAM store 1228 via a DRAM interface 1230. In one embodiment, DRAM store 1228 employs DDR (double data rate) DRAM. In other embodiment DRAM store may employ Rambus DRAM (RDRAM) or reduced-latency DRAM (RLDRAM).

General-purpose processor 1218 may be employed for various network processor operations. In one embodiment, control plane operations are facilitated by software executing on general-purpose processor 1218, while data plane operations are primarily facilitated by instruction threads executing on microengines 1201.

Media and switch fabric interface 1220 is used to interface with the media switch fabric for the network element in which the line card is installed. In one embodiment, media and switch fabric interface 1220 employs a System Packet Level Interface 4 Phase 2 (SPI4-2) interface 1232. In general, the actual switch fabric may be hosted by one or more separate line cards, or may be built into the chassis backplane. Both of these configurations are illustrated by switch fabric 1234.

PCI controller 1221 enables the network processor to interface with one or more PCI devices that are coupled to backplane interface 1204 via a PCI interface 1236. In one embodiment, PCI interface 1236 comprises a PCI Express interface.

During initialization, coded instructions comprising instruction threads 1210 to facilitate various packet-processing operations are loaded into control stores 912. An instruction thread for performing memory scrubbing may also be loaded at this time. In one embodiment, the instructions are loaded from a non-volatile store 1238 hosted by line card 1202, such as a flash memory device. Other examples of non-volatile stores include read-only memories (ROMs), programmable ROMs (PROMs), and electronically erasable PROMs (EEPROMs). In one embodiment, non-volatile store 1238 is accessed by general-purpose processor 1218 via an interface 1240. In another embodiment, non-volatile store 1238 may be accessed via an interface (not shown) coupled to internal interconnect 1212.

In addition to loading the instructions from a local (to line card 1202) store, instructions may be loaded from an external source. For example, in one embodiment, the instructions are stored on a disk drive 1242 hosted by another line card (not shown) or otherwise provided by the network element in which line card 1202 is installed. In yet another embodiment, the instructions are downloaded from a remote server or the like via a network 1244 as a carrier wave.

The schemes described herein can be used to correct errors in an instruction word or any other type of ECC-protected data. Typically, data stored in off-chip RAM or in large on-chip RAM may also employ ECC protection. In general, the principles and techniques described herein may be useful in any applications that are sensitive to the average read latency from the on-chip or off-chip RAM. For applications that are not sensitive to the read latency, one standard approach would be to add an appropriate number of cycles to the data path to allow SEC-DED to be done on every memory access. For latency-sensitive RAM reads, such as for an instruction store, a scheme may be implemented such that it only adds extra latency for SEC operations corresponding to actual detected errors, while the SED aspect adds no additional latency. Because ECC errors are typically not common, the average read delay of the memory systems remains close to that of a system that does not employ ECC. Moreover, the schemes described herein can be used to simplify implementing an ECC sub-system to any latency-sensitive RAM read.

In the embodiments described herein, an extra check bit is added to speed up the calculation of the SED operation. However, the particular number of check bits the are added may be application and data word size specific. Under the conventional example described above with reference to FIG. 1, the data (instruction) word is logically partitioned into bytes and an SEC-DED ECC encoding scheme is used for each byte. Hence, this results in a non-minimum ECC code for covering the whole data word. The inventive schemes differ from this conventional approach in that it uses a non-minimum ECC coding only to support the fast SED aspect of the scheme. A non-minimum encoding would be one where more than the minimum number of ECC bits required by Hamming's theory are used and/or the ECC bit encodings are selected in a manner that does not result in the minimum amount of logic (logic gates or logic fanout) required for the SEC-DED operation. The inventive schemes couple a quick SED operation with an efficient encoding of the SEC-DED operations. For example, Hamming's work indicates that a seven-bit ECC can be employed to implement SEC-DED on a 32 to 63 bit data word. After the SED logic detects an error, the more optimal SEC-DED coding can be used to correct the error.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
performing a first parity check calculation to determine a parity of a first subset of a plurality of bits of an instruction word and a second parity check calculation to determine a parity of a second subset of the plurality of bits of the instruction word, wherein the first subset of bits and the second subset of bits collectively include all instruction bits in the plurality of bits of the instruction word;
detecting that an error is present in the instruction word based on the parity check calculations for the first and second subsets of bits; and
in response to the detecting that the error is present in the instruction word,
stopping a state machine for a processor on which the instruction word is to be executed,
saving machine state data for the state machine, and
performing further error processing of the instruction word, including performing a third parity check calculation to determine a parity of a third subset of the plurality of bits of the instruction word.

2. The method of claim 1, wherein performing further error processing of the instruction word further comprises:
performing a single error correction (SEC) process to correct the detected error in the instruction word.

3. The method of claim 2, wherein the SEC process is performed using an error correction coding (ECC) scheme implemented using a plurality of subsets of bits for the instruction word.

4. The method of claim 2, further comprising:
after performing the single error correction (SEC) process to correct the detected error in the instruction word,
restoring the machine states for the state machine, and
executing the corrected instruction word.

5. The method of claim 3, wherein the plurality of subsets of bits include at least one of the first and second subsets of bits.

6. The method of claim 3, further comprising performing a double error detection (DED) operation using the ECC scheme.

7. The method of claim 1, wherein the operations of detecting that the error is present in the instruction word and stopping the state machines are performed within a single cycle.

8. The method of claim 1, wherein the instruction word contains a plurality of instruction bits concatenated with a plurality of check bits, and the parity check calculation for the first subset of bits is calculated over multiple selected instruction bits from among the plurality of instruction bits and multiple selected check bits from among the plurality of check bits including a check bit for the first subset of bits.

9. The method of claim 1, further comprising:
employing a respective first and second parity check bit for each of the first and second subset of bits, the instruction word including the first and second parity bits;
performing the parity check calculation for each of the first and second subsets of bits using a value of the respective first and second parity check bits in the instruction word.

10. The method of claim 1, further comprising:
iteratively performing a memory scrubbing operation including,
reading an instruction word from a memory,
performing a single error detection (SED) operation on the instruction word to determine if it contains an error,
in response to the determining of an error,
performing a single error correction (SEC) operation to produce a corrected instruction word,
writing the corrected instruction word back to the memory, and
returning to the performing of a SED operation for a next instruction word,
otherwise, if an error is not detected
returning to the performing of a SED operation for a next instruction word.

11. An integrated circuit, comprising:
at least one state machine;
logic to implement an error correction code (ECC) mechanism employing a plurality of subsets of bits, each subset of bits comprising a unique set of bit positions for an instruction word;
logic to perform a parity check for first and second subsets of bits in the plurality of subsets of bits, the first and second subsets collectively covering all of the bits in the instruction word;
logic to detect that an error is present in the instruction word based on the parity checks for the first and second subsets of bits;
logic to generate a single error detection (SED) signal in response to detecting the error in the instruction word;
logic, responsive to the SED signal, to stop the at least one state machine, to save state information corresponding to the at least one state machine, and to perform further error processing of the instruction word, including performing a third parity check calculation to determine a parity of a third subset of the plurality of bits of the instruction word.

12. The integrated circuit of claim 11, wherein the logic to perform the parity check for the first and second subsets of bits comprises first and second XOR trees having multiple logic levels, the bits in the first subset comprising inputs to a first logic level in the first XOR tree, the bits in the second subset comprising inputs to a first logic level in the second XOR tree, each of the first and second subset of bits including a corresponding parity bit for the instruction word.

13. The integrated circuit of claim 12, wherein the parity check comprises an even parity check, and the logic further includes a logical OR block having first and second inputs respectively coupled to first and second outputs of the first and second XOR trees.

14. The integrated circuit of claim 11, further comprising:
an execution datapath;
wherein the logic to perform further error processing responsive to the SED signal includes logic to perform a single error correction (SEC) operation on the instruction word using the ECC mechanism to generate a corrected instruction word; and
logic to forward the corrected instruction word to be executed via the execution datapath.

15. The integrated circuit of claim 11, wherein the integrated circuit comprises a network processor unit having a plurality of compute engines, including at least one compute engine comprising:
a control store to store the instruction word;
an instruction register coupled to the control store;

the logic to implement the error correction code (ECC) mechanism employing the plurality of subsets of bits, each subset of bits comprising a unique set of bit positions for the instruction register;

the logic to perform the parity check for first and second subsets of bits in the plurality of subsets of bits, the first and second subsets collectively covering all of the bits in the instruction word; and the logic to detect that the error is present in the instruction word based on the parity checks for the first and second subsets of bits.

16. A network line card, comprising:

a printed circuit board (PCB);

a backplane connector, coupled to the PCB;

an interconnect comprising a plurality of address and data bus lines formed in the PCB;

Dynamic Random Access Memory (DRAM), coupled to the interconnect; and a network processor unit, coupled to the interconnect, including a plurality of compute engines, at least one compute engine including, a control store to store an instruction word;

an instruction register coupled to the control store;

an execution datapath;

at least one state machine;

logic to implement an error correction code (LCC) mechanism employing a plurality of subsets of bits, each subset of bits comprising a unique set of bit positions for the instruction register;

logic to perform a parity check for first and second subsets of bits in the plurality of subsets of bits, the first and second subsets collectively covering all of the bits in the instruction word;

logic to detect that an error is present in an instruction word based on the parity checks for the first and second subsets of bits;

logic to generate a single error detection (SED) signal in response to detecting the error in the instruction word;

logic, responsive to the SED signal, to stop the at least one state machine, to save state information corresponding to the at least one state machine, and to perform further error processing of the instruction word, including performing a third parity check calculation to determine a parity of a third subset of the plurality of bits of the instruction word.

17. The network line card of claim 16, wherein the logic to perform the parity check for the first and second subsets of bits comprises first and second XOR trees having multiple logic levels, the bits in the first subset comprising inputs to a first logic level in the first XOR tree, the bits in the second subset comprising inputs to a first logic level in the second XOR tree, each of the first and second subset of bits including a corresponding parity bit for the instruction word, further wherein the parity check comprises an even parity check, and the logic further includes a logical OR block having first and second inputs respectively coupled to first and second outputs of the first and second XOR trees.

18. The network line card of claim 16, wherein the at least one compute engine further includes:

wherein the logic to perform further error processing responsive to the SED signal includes logic to perform a single error correction (SEC) operation on the instruction word using the ECC mechanism to generate a corrected instruction word, and logic to forward the corrected instruction word to be executed via the execution datapath.

* * * * *

UNITED STATES PATENT AND TRADEMARK OFFICE
CERTIFICATE OF CORRECTION

PATENT NO.      : 7,447,948 B2
APPLICATION NO. : 11/284268
DATED           : November 4, 2008
INVENTOR(S)     : Galbi et al.

Page 1 of 3

It is certified that error appears in the above-identified patent and that said Letters Patent is hereby corrected as shown below:

Replace formal drawings for Figure 2a and Figure 2b with Figure 2a and Figure 2b attached.

Replace formal drawings for Figure 9 with Figure 9 attached.

Signed and Sealed this

Eighteenth Day of August, 2009

David J. Kappos
*Director of the United States Patent and Trademark Office*